United States Patent

[11] 3,599,967

[72] Inventors Hans Rapparlie;
Werner Frank, both of Constance, Germany
[21] Appl. No. 887,932
[22] Filed Dec. 24, 1969
[45] Patented Aug. 17, 1971
[73] Assignee Telefunken Patentverwertungsgesellschaft m.b.H.
Ulm Danube, Germany
[32] Priority Dec. 27, 1968
[33] Germany
[31] P 18 17 101.2

[54] DEVICE FOR SEPARATING FLAT ITEMS SUCH AS MAIL FROM A STACK
6 Claims, 12 Drawing Figs.
[52] U.S. Cl. ................................................. 271/12, 271/26, 271/57
[51] Int. Cl. ................................................. B65h 5/02, B65h 7/12
[50] Field of Search ......................................... 271/12, 13, 26, 34, 35, 57

[56] References Cited
UNITED STATES PATENTS
3,108,801 10/1963 Van Dalen .................... 271/34 X
3,347,348 10/1967 Flint et al. .................... 271/12 X

*Primary Examiner*—Joseph Wegbreit
*Attorney*—Spencer & Kaye

ABSTRACT: A flat item separator composed of three alternately disposed, consecutive synchronized suction belts and an abutment at the output of each of the first two belts, and means for causing the occurrence of a multiple removal by any separator stage to stop that separator stage during the next item removal phase.

Inventors.
Hans Rapparlie
Werner Frank

Inventors.
Hans Rapparlie
Werner Frank

BY Spencer & Kaye
ATTORNEYS.

# DEVICE FOR SEPARATING FLAT ITEMS SUCH AS MAIL FROM A STACK

BACKGROUND OF THE INVENTION

The present invention relates to devices for separating flat items, particularly pieces of mail, from a stack.

In the prior art, for example in Belgian Pat. No. 715,639, there is disclosed a device for individually removing flat items, such as letters in particular, from a stack, where the input of a second suction belt separator stage is connected to the output of the first suction belt separator stage which receives the stack. Beyond the suction region of the second separator stage, which is to one side of the conveying path, there is disposed an abutment which extends into the conveying path from the other side of the path and a monitoring member responsive to the presence of an item is disposed in the region of the abutment. The conveying path is here considered as the plane along which items travel while passing through the separating device. Thus, the region adjacent each side of this plane constitutes one respective side of the conveying path.

The suction belts are driven so as to have a precisely controlled phase relationship with respect to the corresponding suction openings so that the suction openings of the second separator stage do not grip the items until they have reached the region of the abutment. An interrupting device is provided at the first separator stage to prevent the removal of an item when it receives a signal from the monitoring member. There is further provided an interrogating device which permits a signal from the monitoring member indicating the presence of an item to reach the interrupting device periodically only during a fixed time period which extends between the passage out of the sensing range of the monitoring member of the rear edge of an individual item gripped by a suction opening of the second separator stage and the response of the monitoring member to the front edge of the next item.

The use of this principle results in a separation operation having a particularly low incidence of error with regard to double removal, i.e. the simultaneous removal of two items from the stack.

Belgian Pat. No 715,639 discloses embodiments in which the suction belt of the second separator stage is disposed on the same side of the conveying path as the suction belt of the first separator stage and in which a suction stripper is disposed at the other side of the conveying path and cooperates at the output of each one of the two separator stages with the respective suction belt.

SUMMARY OF THE INVENTION

It is a primary object of the present invention to provide an improved separating device of the above-described type.

A more specific object of the present invention is to provide a device which does not include suction strippers and yet has an extremely low error incidence.

According to several principal features of the invention, embodiments are constructed so that:

a. the suction belt of the second separator stage is disposed on the side of the conveying path which is opposite to the suction belt of the first separator stage and an interrupting device is also provided at the second separator stage which prevents the application of suction and removal of an item when a signal is received;

b. the input of a third suction belt separator stage is connected to the output of the second separator stage, the suction belt of the third separator stage being disposed opposite the suction belt of the second separator stage and being driven so that its suction openings have a precise phase relationship with those of the two other suction belts so that its suction openings cannot grip the items brought by the second separator stage until they come within the range of a second abutment disposed at the third separator stage; and c. a second monitoring member is disposed in the region of the third separator stage for responding to the presence of an item as well as a second interrogating device which permits a signal from the monitoring member to reach the interrupter of the second separator stage periodically only within a fixed time period which extends between the departure from the sensing zone of the monitoring member of the trailing edge of an individual item carried away be suction openings of the third separator stage and the response of the monitoring member to the leading edge of the next item.

DESCRIPTION OF THE PREFERRED EMBODIMENTS

Figure 1:
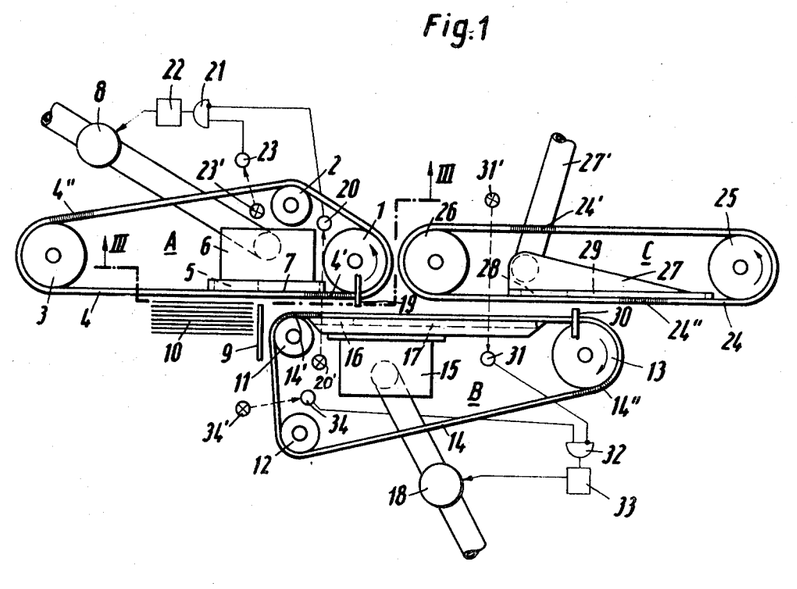
FIG. 1 is a schematic plan view of a first embodiment of the present invention.

FIG. 1 shows a first embodiment of the invention in which a first separator stage A contains a suction belt 4 brought around rollers 1, 2 and 3, and provided with two groups of suction openings 4′ and 4″. One group of suction openings 4′ is shown in greater detail in FIG. 3. Hereinafter, for purposes of brevity, groups of suction openings will be referred to simply as "suction openings."

Figure 3:
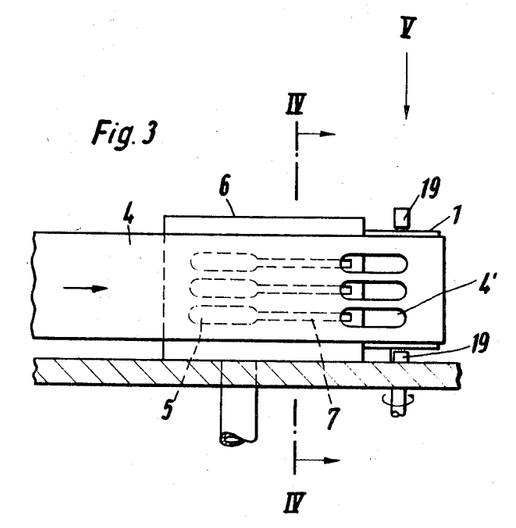
FIG. 3 is a partial elevational view, to an enlarged scale, of the first separator stage along line III–III of FIG. 1.

As is best shown in FIG. 3 suction slits 5 aligned with suction openings 4′ and 4″ are disposed in the frontal plate of a suction trough 6 disposed behind the suction belt 4. In a known manner, for example as disclosed in German Pat. No. 1,112,086, narrow conveying slits 7 follow the suction slits 5. The suction trough 6 is connected, via a controllable valve 8 which is normally open, with a suction air source (not shown).

Approximately opposite the forward end of suction slits 5, i.e. the downstream end with respect to the conveying direction, there is disposed an abutment wall 9 against which the leading edges of the mail items disposed in stack 10 come to rest. The distance between the abutment wall 9 and the suction belt 4 is selected so that items having the greatest permissible thickness can pass between them.

In a corresponding manner the second separator stage B contains a suction belt 14 brought around rollers 11, 12 and 13 and having groups of suction openings 14′ and 14″ as well as a suction trough 15 with suction slits 16 and narrow conveying slits 17, the trough being in connection with the suction air source via a normally open controllable valve 18.

In front of, i.e. downstream of the conveying direction, the suction zone of suction slits 16 of the second separator stage B, a substantially rigid abutment 19 extends into the conveying path from the side thereof which is opposite the side at which belt 14 is disposed. As is shown most clearly in FIGS. 3 and 4, abutment 19 is composed of two parts. For reasons of clarity it is not shown in the drawing how this abutment is supported. The conveying slits 7 of the first separator stage A extend toward the abutment 19 to a point such that the items carried along by the suction openings 4′, 4″ will not be released until shortly before reaching abutment 19, release occurring when the suction openings move out of the effective zone of action of the conveying slits 7. The relationships involved are shown in FIG. 3.

Figure 2:
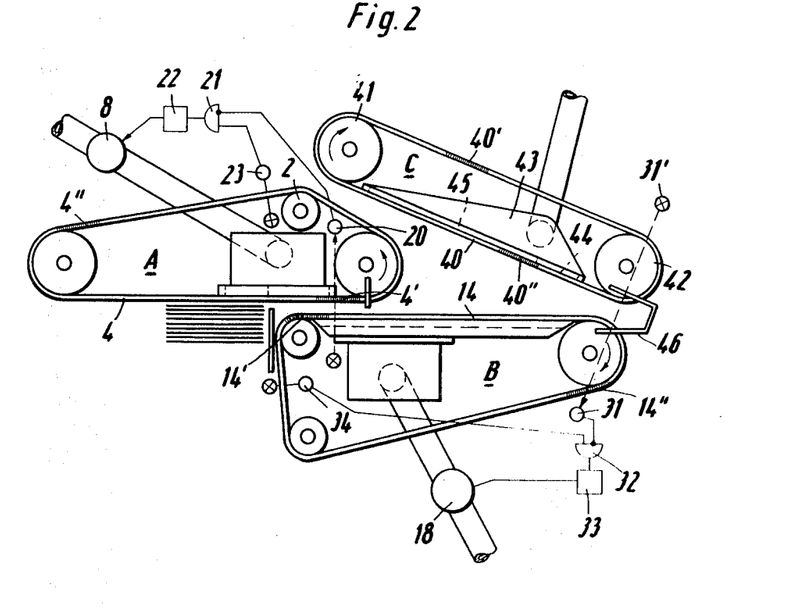
FIG. 2 is a schematic plan view of a second embodiment of the present invention.

As can be seen in both FIGS. 1 and 2 the zones of action of the two suction troughs 6 and 15 overlap one another along the conveying path in such a manner that part of the suction zone of suction slits 16 of the second separator stage B is disposed opposite part of the zone of conveying slits 7 of the first separator stage A.

The suction belts 4 and 14 are driven in synchronism to maintain a precise phase relationship between the corresponding suction openings 4', 4" and 14', 14" so that suction openings 14', 14" will not be in a position to grip the items until they have reached the vicinity of abutment 19.

Near abutment 19 and above or below belt 4, bearing in mind that FIGS. 1 and 2 are plan views, there is provided a monitoring member which responds to the presence of an item and which is constructed in the form of an electric eye unit composed of a light source 20' and a light sensor 20. The output of the light sensor 20 is connected to a control stage 22 for valve 8 via the negated input of an AND gate 21. The control stage 22 is so constructed that it closes valve 8, after the arrival of a signal from the AND circuit 21, for a predetermined time period which corresponds to the complete passage of suction openings 4' or 4" past slits 5 and 7 of the suction trough 6, so that the removal of a further item from stack 10 is prevented.

A second electric eye unit 23, 23' is arranged so that the light path from source 23' to sensor 23 is aligned with corresponding ones of suction openings 4', 4" of suction belt 4 and is so positioned that the light beam of source 23' always strikes sensor 23, by passing through one of suction openings 4' and 4" during a short time before the arrival of the other suction openings in the area of suction trough 6.

Each sensor 20 and 23 is of a type which produces a signal corresponding to a logic "1" when illuminated by light from its respective source and a signal corresponding to a logic "0" when the path between sensor and light source is broken. Thus, since sensor 20 is connected to a negated input of AND gate 21, that gate will produce an output to trigger the closing of valve 8 only when source 23 is illuminated at the same time that the light path between source 20' and sensor 20 is blocked by an item in the vicinity of abutment 19.

Elements 21—23 thus form an interrogating device which, as in Belgian Pat. No. 715,639, permits a logic "0" signal from the sensor 20, corresponding to the presence of an item in the vicinity of abutment 19, to periodically pass through gate 21 to control stage 22 only during a fixed time period which occurs in the interval between the movement beyond the light path 20-20' by the trailing edge of an individual item gripped by suction openings 14' or 14" of the second separator stage B and the blocking of the light path by the leading edge of the next item. As will become more readily apparent from the description of operation to be presented below, valve 8 will not be closed if light path 20-20' is not blocked during this fixed time period.

In the embodiment of FIG. 1 the suction belt 24 of the third separator stage C is disposed substantially parallel to the portion of suction belt 14 of the second separator stage B which lies along the conveying path and is driven in the same conveying direction as belt 14. It is guided over rollers 25 and 26. Its suction trough 27 is directly connected with the suction source via a pipe 27' and is provided with suction slits 28 and conveying slits 29 corresponding to those of suction troughs 6 and 15.

Beyond the active zone of suction slits 28 of the suction trough 27 of the third separator stage C a second abutment 30 extends into the conveying path from the side thereof opposite the side at which belt 24 is disposed. Suction belt 24 is driven in synchronism with suction belts 4 and 14 to establish a precise phase relationship of its suction openings 24' and 24" with the suction openings 14', 14" of suction belt 14 so that its suction openings will not grip the items brought by suction belt 14 until such items have come within the range of abutment 30.

In the area of separator stage C, and above or below belt 24, there is also disposed an electric eye unit 31, 31' which responds to the presence of an item adjacent abutment 30. The output of sensor 31 of this electric eye unit is connected with a control stage 33 for valve 18 via the negated input of an AND gate 32. Control stage 33 is also so constructed that it closes valve 18, upon the arrival of a signal from the AND gate 32, for a fixed time period which corresponds to the complete passage of suction openings 14' or 14" past slits 16 and 17 of suction trough 15, so that removal of a further item from the area of abutment 19 is prevented.

A further electric eye unit 34, 34' cooperates with suction openings 14', 14" of suction belt 14 in the manner of unit 23, 23' with openings 4', 4" and is so disposed that its light path is unblocked for a short time by one of the suction openings before those suction openings enter into the zone of suction trough 15. Elements 32—34 thus also constitute an interrogator device which in this case permits a signal from light sensor 31 corresponding to the presence of an item in the area of the third separator stage C to act on valve 18 only during a fixed time period which occurs in the interval between the unblocking of light path 31-31' by the movement therepast of the trailing edge of an individual item removed by suction openings 24' or 24" and the blocking of the light path by the leading edge of the next item conveyed by suction belt 14.

Figure 4:
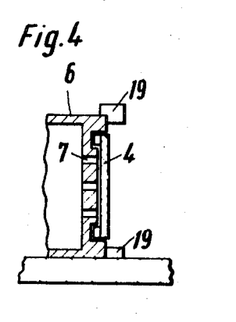
FIG. 4 is a cross-sectional elevational view along the line IV–IV of FIG. 3.
Figure 5:
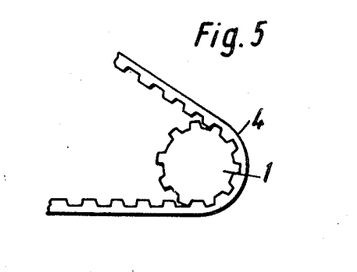
FIG. 5 is a cross-sectional detail plan view in the direction of the arrow V of FIG. 3.

The synchronous movement of suction belts 4, 14 and 24 may be accomplished, for example, by providing them, in one or a plurality of zones, with teeth which engage corresponding teeth of drive rollers 1, 13 and 25, respectively. Such teeth are illustrated in FIGS. 4 and 5 at the edge zones of suction belt 4, but are not shown in the other figures for reasons of simplification. A further possibility would be to provide the suction belts with perforations and the drive rollers with corresponding sprockets.

The embodiment of FIG. 1 operates as follows:

At the outset, suction belts 4, 14 and 24 rotate in the sense shown by the arrows and the two valves 8 and 18 are in their normally open positions. After switching on the suction air, an individual item is removed from stack 10 at the first separator stage A by the suction openings 4' of suction belt 4. It will have just been released by suction belt 4 at the operating moment shown in FIGS. 1 and 3 because suction opening 4' is moving out of the zone of action of conveying slits 7 of suction trough 6.

Approximately at the same time, suction openings 14' of suction belt 14 have reached the effective zone of suction slits 16 of the second separator stage B. The item is thus sucked onto suction belt 14 and is carried along by it. During this process, lightweight items are directly taken along by suction belt 14 whereas heavier items are braked at abutment 19. In a corresponding manner, the item is subsequently sucked onto suction openings 24' of suction belt 24 in the vicinity of abutment 30 and is then brought by this suction belt to the discharge point of the device.

During the sequence described above, valves 8 and 18 always remain open because at time when suction openings 4' unblock the light from source 20' to sensor 23, the trailing edge of the item previously conveyed by openings 4' will have already left the light path of unit 20, 20' so that the latter light path is unblocked and no signal appears at the output of AND circuit 21. Consequently, suction openings 4", which enter into effective zone of suction slits 5 of the first separator stage shortly thereafter, will immediately remove the next item from the stack. The same applies after passage of the trailing edge of the first item through, past the light path of unit 31, 31' of the monitoring device 32—34 for valve 18, so that openings 14" remain effective for the removal of the next item.

Figure 6:
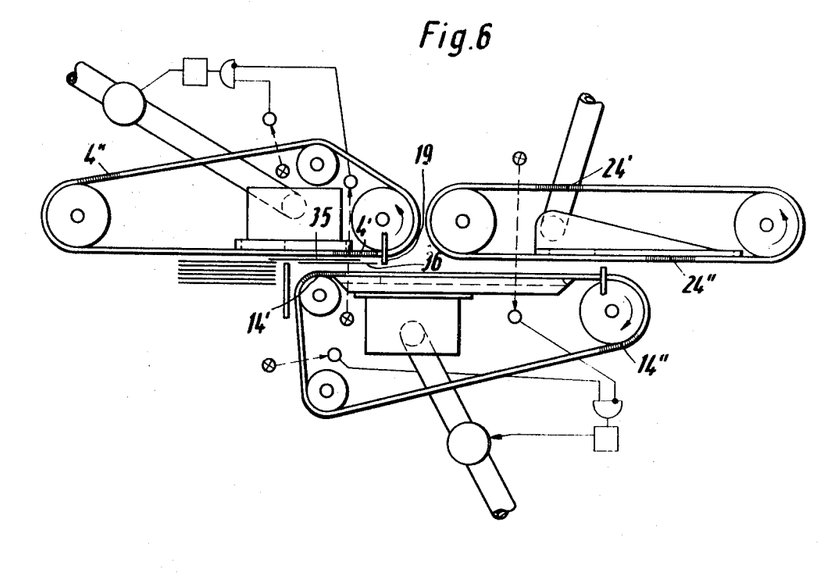
FIGS. 6 through 8 are plan views showing three successive instants in the operation of the embodiment of FIG. 1 when two items having a first type of overlapping are simultaneously removed from a stack.

The second operating example involves a situation in which suction openings 4' removed not just one item, but two items which may overlap one another in such a manner that, as shown in FIG. 6, the leading edge of the item 35, which is in direct contact with suction belt 4, trails that of the second item 36. This represents a double removal with the first type of overlapping. In this case, suction openings 14' can only grip and remove this second item 36, whereas the first item 35 remains at first in the vicinity of abutment 19.

Figure 7:
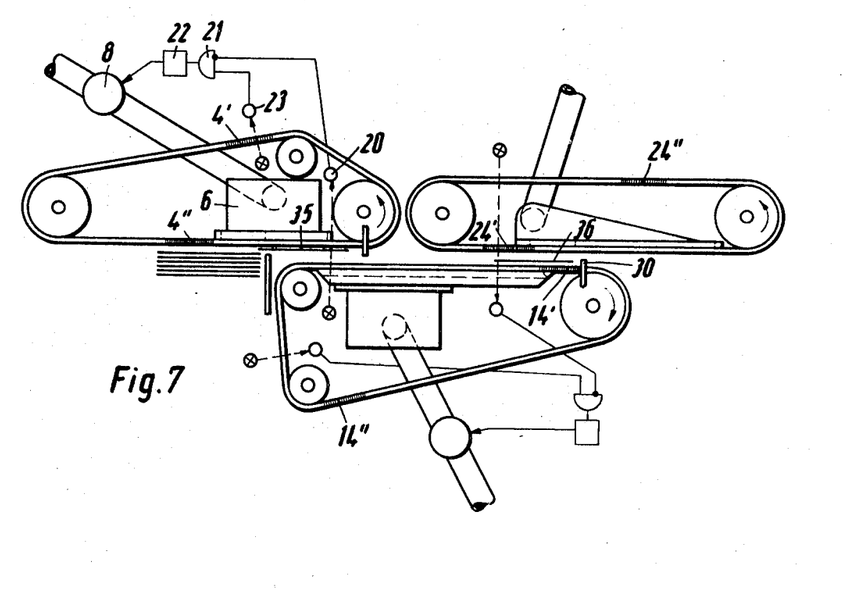

As can be seen in FIG 7, the light sensor 20 in then obturated by item 35 at the time when the light path 23, 23' is subsequently unblocked by the suction openings 34'. Consequently a signal reaches control stage 22 which closes valve 8 for the duration of the passage of suction openings 4" along suction trough 6 and no further removal takes place. The second item 36 has in the meantime reached the area of abutment 30 and is taken over and transported by suction openings 24'.

Figure 8:
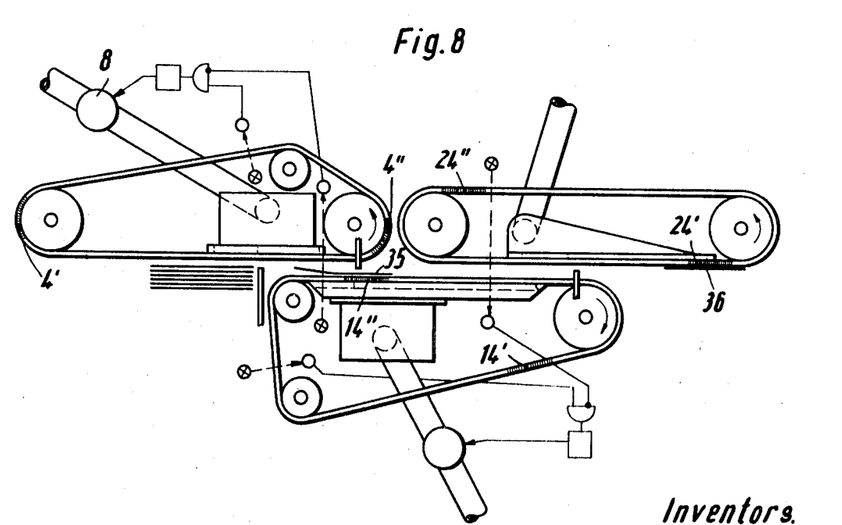

Directly after passage of suction openings 4" beyond trough 6, item 35 is sucked onto belt 14 by suction openings 14" of the second separator stage and is thus removed as shown in FIG. 8. Thus, the light path 20, 20' is unblocked again and during the next passage of suction openings 4' along trough 6 valve 8 remains open so that another item is removed from stack 10.

Figure 9:
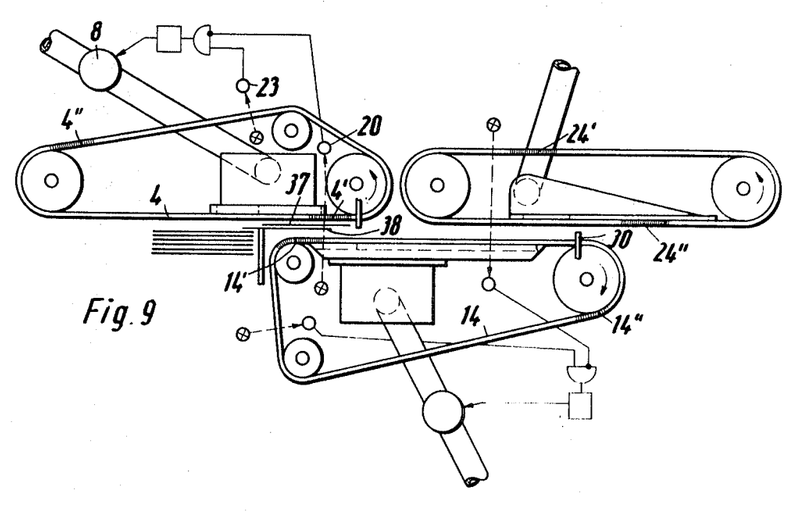
FIGS. 9 through 12 are plan views showing four successive instants in the operation of the embodiment of FIG. 1 upon simultaneous removal from the stack of two items having a second type of overlapping.
Figure 10:
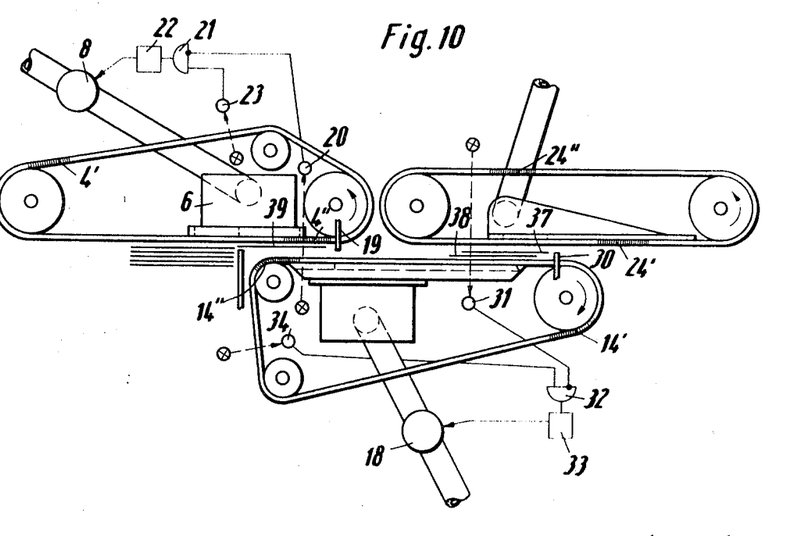

FIGS. 9 through 12 relate to the third operating example in which suction openings 4' have also effected a double removal but this time the items are overlapped in such a manner that the leading edge of the second item 38 is disposed behind that of the item 37 which is in direct contact with suction belt 4. This overlapping, shown in FIG. 9, is of the second type. In this case, both items can be sucked onto suction belt 14 by suction openings 14' and are conveyed by belt 14 in the direction toward abutment 30. Since, consequently, the light path 20, 20' is unblocked before passage of suction openings 4" along suction trough 6, i.e. when light path 23, 23' is unblocked by a suction opening 4', valve 8 remains in its normal position, i.e. open, and a further item 39 is removed from the stack by suction openings 4". This operating state is shown in FIG. 10 in which all suction belts have advanced by half their circumference with respect to FIG. 9.

As can be seen in FIG. 10 light sensor 31 had already been obturated by items 37 and 38 during the period when light path 34, 34' was unblocked by a suction opening 14". Consequently, a signal reached control stage 33 via the AND gate 32 so that during the subsequent passage of suction openings 14" along trough 15 valve 18 is closed. Item 39 is thus not sucked onto belt 14 but remains at abutment 19.

Figure 11:
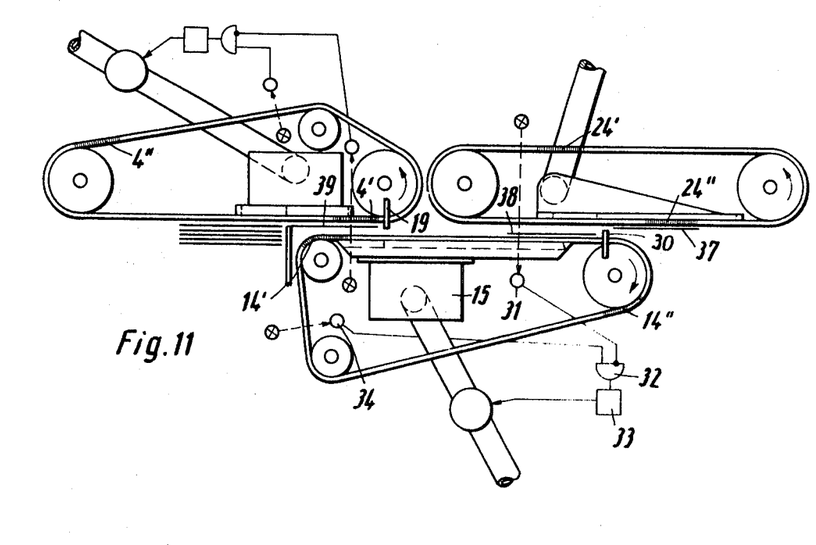

At the instant shown in FIG. 11 all suction belts have advanced a further half-circumference with respect to the instant of FIG. 10. Item 37 has been gripped by suction openings 24" and is being removed whereas item 38 remains in the area of abutment 30. Since light path 31, 31' is still blocked by item 38, control stage 33 has again received a valve-closing signal during the unblocking of light path 34, 34' by the passage of suction openings 14' so that valve 18 again remains closed during the next passage of suction openings 14' along suction trough 15. Item 39 is thus not transported toward abutment 30 but continues to remain at abutment 19.

Figure 12:
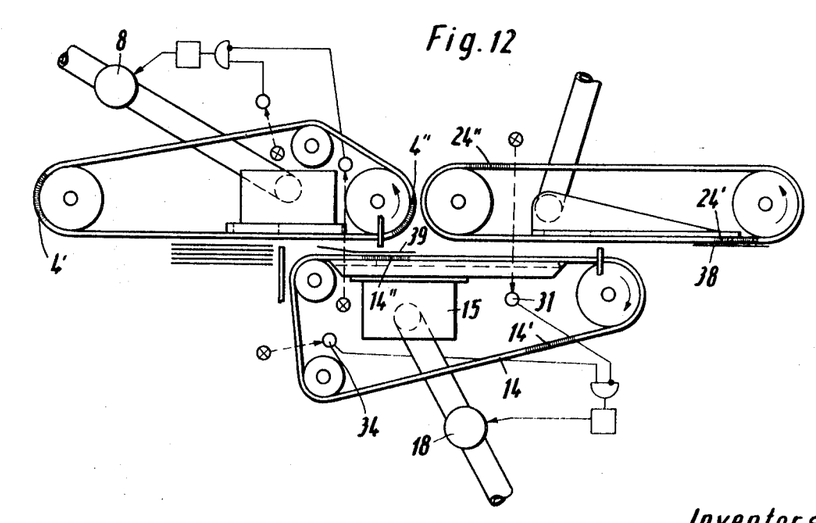

FIG. 12 shows the next operating period in which the suction belts are moved by more than half a circumference with respect to the positions of FIG. 11. During the interval between the positions of FIGS. 10 and 11, item 38 was gripped by suction openings 24" and has been removed so that during the unblocking of light path 34, 34' by one of the openings 14", light path 31, 31' was unblocked. Valve 18 thus remains open during the passage of suction openings 14" along suction trough 15, so that item 39 is now sucked onto suction belt 14 and is conveyed by it.

The above examples show that with the device according to the present invention in contrast with that disclosed in Belgian Pat. No. 715,639, three consecutive separators are an absolute necessity and their systematic cooperation makes it possible to unerringly separate double removals overlapping in any direction without the use of suction air strippers. Since suction air strippers are subject to a substantial amount of wear, this constitutes a substantial practical advance.

The embodiment illustrated in FIG. 2 differs from that of FIG. 1 in that the suction belt 40 of the third separator stages C' forms an acute angle with the reach of suction belt 14 which acts in the conveying path and is driven in a sense to reverse the conveying direction of the items gripped by its suction openings 40' or 40". Belt 10 runs around rollers 41 and 42. Suction trough 43 is provided with suction slits 44, in the same manner as suction trough 27 of FIG. 1, followed by conveying slits 45 extending in the conveying direction. The second abutment 46 which replaces abutment 30, is disposed approximately at the vertex of the angle formed by suction belts 14 and 40.

The mode of operation of the embodiment of FIG. 2 coincides in all substantial phases with that of the embodiment shown in FIG. 1 and explained with reference FIGS. 6 to 12. The difference is that the items reaching the area of abutment 46 are not carried off in the same direction but are removed by suction belt 40 in the opposite conveying direction. Thus the original leading edge of the items becomes the trailing edge.

According to another feature of the invention, the third separator stage C' may be disposed, by placing its roller 41 closer to roller 2 so that at the discharge point of the entire separator device suction belt 40 cooperates with the return reach of suction belt 4 between rollers 1 and 2 of the first separator stage A.

The valves 8 and 18 and their control circuits can be constituted by any well-known, commercially available devices. Thus valves 8 and 18 may be constituted by standard electronically controlled valves and control units 22 and 33 could be any known pulse-triggered square wave generators having an adjustable output signal duration. Units 22 and 33 could also be constituted by electronically controlled, preset electronic or mechanical timers.

It will be understood that the above description of the present invention is susceptible to various modifications, changes and adaptations, and the same are intended to be comprehended within the meaning and range of equivalents of the appended claims.

We claim:

1. In apparatus for separating flat items from a stack and for moving them along a conveying path, which apparatus includes: first and second suction separator stages apaced along the conveying path and each including a suction belt having spaced groups of suction openings and a suction trough disposed along the belt, the first stage being arranged to take items, by its suction openings, from the stack and the second stage being disposed downstream of the first stage in the conveying direction for conveying items from the first stage by its suction openings; a first abutment member extending into the conveying path downstream of the initial portion of the effective suction zone of the second separator; first monitoring means disposed for producing an indication of the presence of an item adjacent the first abutment member; and first control means associated with the first separator stage and connected to the first monitoring means for preventing the first separator stage from removing an item from the stack when the monitoring means has produced such an indication during a given time period which occurs in the interval between the departure from the sensing zone of the monitoring means of the trailing edge of an item carried off by the second separator stage and the normal arrival at such of the leading edge of the next item at such sensing zone, the improvement wherein said suction belt of said second separator stage is disposed to the opposite side of the conveying path from said suction belt of said first separator stage and said suction belts of said first and second stages are driven in synchronism with a precise phase relationship such that an item can be gripped by a group of suction openings of said belt of said second stage only after having been brought to said first abutment member by a group of suction openings of said belt of said first stage, and wherein said apparatus further comprises:

suction-interrupting means connected to said second stage for terminating suction at said second stage, and thereby preventing said stage from conveying an item, upon the occurrence of an interruption signal;

a third separator stage composed of a suction belt having spaced groups of suction openings and a suction trough disposed along said belt, said third stage having its input end adjacent the output end of said second stage and being positioned opposite to said second stage;

a second abutment member disposed at said third stage;

said belt of said third stage being driven in synchronism with said belt of said second stage with a precise phase relationship such that an item can be gripped by a group of suction openings of said belt of said third stage only after having been brought to said second abutment member by a group of suction openings of said belt of said second stage;

second monitoring means disposed for producing an indication of the presence of an item adjacent said second abutment member; and second control means associated with said separator stage and connected between said second monitoring means and said suction-interrupting means for applying an interruption signal to said suction-interrupting means only when said second monitoring means has produced such an indication during a given time period which occurs in the interval between the departure from the sensing zone of said second monitoring means of the trailing edge of an item carried off by said third separator stage and the normal arrival of the leading edge of the next item at the sensing zone of said second monitoring means.

2. An arrangement as defined in claim 1 wherein said suction trough of each of said first and second separator stages in provided with a group of suction slits aligned with each group of suction openings and with a group of conveying slits which are narrower than said suction slits and which extend from said suction slits in the conveying direction, said conveying slits of said troughs of said first and second stages terminating at distances from said first and second abutment members, respectively, such that items being conveyed are released by each said stage before reaching said respective abutment.

3. An arrangement as defined in claim 1 wherein said suction belt of said third stage is disposed substantially parallel to said suction belt of said second separator stage and is driven in a direction for conveying items in the same direction as said belt of said second stage.

4. An arrangement as defined in claim 1 wherein said suction belt of said third separator stage lies at an acute angle to said suction belt of said second separator stage and is driven in a manner for conveying items in a direction substantially opposite, and at such acute angle, to the direction in which items are conveyed by said suction belt of said second stage.

5. An arrangement as defined in claim 4 wherein said suction belt of said third separator stage is positioned for cooperating with a return reach of said suction belt of said first separator stage to define the outlet region of said apparatus.

6. An arrangement as defined in claim 1 wherein one of said monitoring means comprise a first electric eye unit arranged to have its light path blocked by an item adjacent its associated abutment member; and one of said control means comprise a second electric eye unit having its light path aligned with one suction opening of each group of said belt of its associated separator state, and an AND gate having an enabling input connected to said second electric eye unit and an output for producing a signal which prevents its associated separator stage from conveying an item each time its associated monitoring means produces an indication simultaneously with the presence of a suction opening in the light path of said second electric eye unit.